United States Patent
Madhani et al.

(10) Patent No.: US 7,238,079 B2
(45) Date of Patent: Jul. 3, 2007

(54) ANIMATRONIC SUPPORTED WALKING SYSTEM

(75) Inventors: Akhil Jiten Madhani, Glendale, CA (US); Holger Irmler, Studio City, CA (US); Alexis P. Wieland, Los Angeles, CA (US); Bryan S. Tye, Canyon Country, CA (US)

(73) Assignee: Disney Enterprise, Inc., Burbank, CA (US)

( * ) Notice: Subject to any disclaimer, the term of this patent is extended or adjusted under 35 U.S.C. 154(b) by 127 days.

(21) Appl. No.: 10/757,797

(22) Filed: Jan. 14, 2004

(65) Prior Publication Data

US 2004/0219861 A1    Nov. 4, 2004

Related U.S. Application Data

(60) Provisional application No. 60/440,291, filed on Jan. 14, 2003.

(51) Int. Cl.
  *A63H 7/00*  (2006.01)
(52) U.S. Cl. .................. 446/355; 446/377; 700/245
(58) Field of Classification Search ............... 446/454, 446/456, 330, 353, 354, 355, 356, 175; 700/245; 901/1
  See application file for complete search history.

(56) References Cited

U.S. PATENT DOCUMENTS

| | | | |
|---|---|---|---|
| 4,202,423 A | 5/1980 | Soto | |
| 4,503,924 A | 3/1985 | Bartholet et al. | |
| 4,511,011 A | 4/1985 | Bartholet | |
| 4,527,650 A | 7/1985 | Bartholet | |
| 4,558,758 A | 12/1985 | Littman et al. | |
| 4,565,487 A | 1/1986 | Kroczynski | |
| 4,717,364 A * | 1/1988 | Furukawa | 446/175 |
| 4,840,242 A | 6/1989 | Chih et al. | |
| 5,121,805 A | 6/1992 | Collie | |
| 5,151,859 A | 9/1992 | Yoshino et al. | |
| 5,157,316 A | 10/1992 | Glovier | |
| 5,158,493 A * | 10/1992 | Morgrey | 446/355 |
| 5,159,988 A | 11/1992 | Gomi et al. | |
| 5,221,883 A | 6/1993 | Takenaka et al. | |
| 5,353,886 A | 10/1994 | Paakkunainen | |
| 5,404,086 A * | 4/1995 | Takenaka et al. | 318/568.12 |
| 5,484,031 A | 1/1996 | Koyachi et al. | |
| 5,644,204 A | 7/1997 | Nagle | |
| 5,808,433 A | 9/1998 | Tagami et al. | |
| 5,838,130 A | 11/1998 | Ozawa | |
| 5,842,533 A | 12/1998 | Takeichi | |
| 5,929,585 A | 7/1999 | Fujita | |
| 6,192,215 B1 | 2/2001 | Wang | |
| 6,317,652 B1 * | 11/2001 | Osada | 700/245 |
| 2002/0193908 A1 | 12/2002 | Parker et al. | |

* cited by examiner

*Primary Examiner*—Robert Olszewski
*Assistant Examiner*—Alex F. R. P. Rada, II
(74) *Attorney, Agent, or Firm*—Kent A. Lembke; Hogan & Hartson L.L.P.

(57) ABSTRACT

In one aspect, a supported walking system is disclosed, comprising a robotic walking figure and a wheeled support that at least partially supports the robotic walking figure. The supported walking system may be driven and controlled by a human operator. Computer algorithms automatically control the robot's walking functions so that it may step forwards, backwards, and sideways in synchronicity with the movements of the cart while driving and turning at varying speeds.

18 Claims, 12 Drawing Sheets

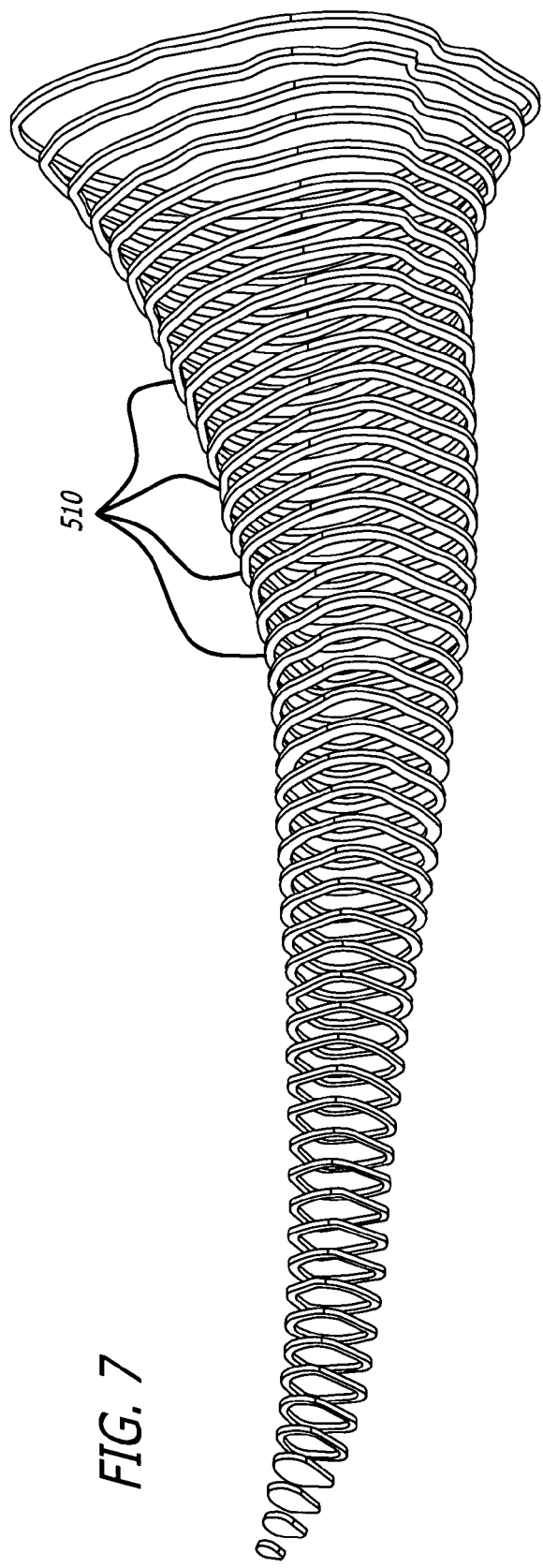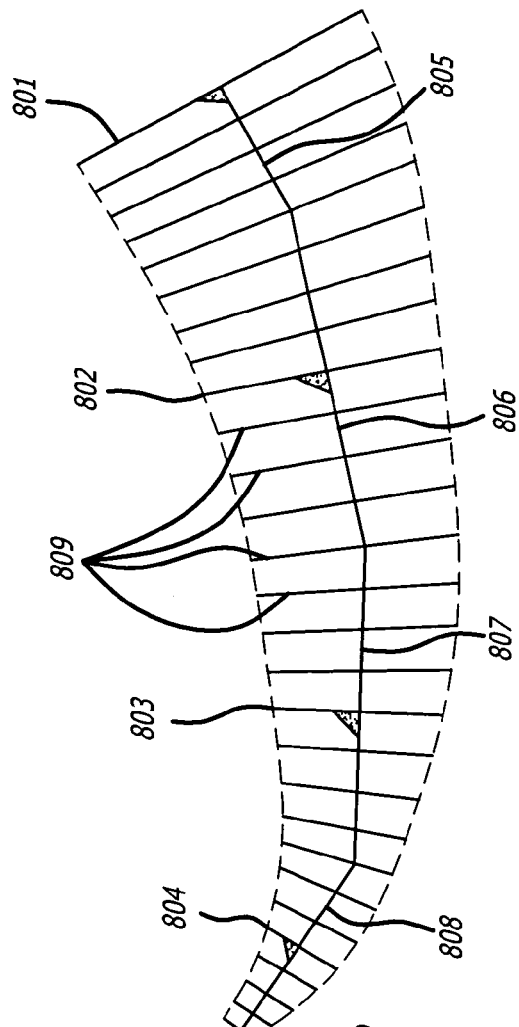
FIG. 7
FIG. 8

ANIMATRONIC SUPPORTED WALKING SYSTEM

RELATED APPLICATIONS

This application claims priority from U.S. Provisional Patent Application No. 60/440,291, filed Jan. 14, 2003, which is hereby incorporated by reference in its entirety.

BACKGROUND

I. Field

An animatronic supported walking system and method is generally disclosed.

II. General Background

Animatronic figures are those which employ electronics or other mechanical, hydraulic, and pneumatic parts to animate puppets. Animatronic characters are popular in entertainment venues such as theme parks. For example, animatronic characters are often employed in shows or rides found in a theme park. However, the animatronic characters are generally in a fixed position. The animatronic character's head or arms may move, but the character is generally not capable of freely roaming or walking from one place to another.

SUMMARY

It is therefore desirable for such characters to walk freely and independently through a theme park, parade or other venue and interact with people and/or things. Furthermore, it is desirable for such an animatronic character to appear quite realistic. However, there are several specific problems to be solved when developing such an animatronic walking figure.

First, real animals can and do fall over. However, in a public venue such as a theme park where safety to each guest, including small children, must be ensured, an animatronic figure must not fall over. It is therefore an object to create a walking robot which looks like an animal, but which cannot fall over and injure guests.

Complex robotic systems also require electronics and computers to function. A mobile system also requires a power supply (battery, engine, etc). It is difficult to place these systems inside the skin, (onboard) the actual robotic figure. If these are placed outside the figure, we must find a way to hide these components while maintaining the illusion that the figure is a real animal. For example, electrical cords cannot be seen exiting the figure.

Ideally, a single operator should command the animatronic figure to move forwards, backwards, and to turn left and right. A robot that looks like an animal might have over 40 individual motors. This is too many for a single operator to simultaneously control. A method or computer algorithm must therefore be created which translates these simple commands into individual joint trajectories that allow the system to walk.

Furthermore, the mechanical understructure of such animatronic figures is necessarily robotic. That is, they are made of joints, gears, actuators, hoses, electrical wiring, and metallic, plastic, or composite structural elements. To make these systems appear lifelike, they must be somehow covered, either by clothing, or by an artificial skin, whether it be smooth, or covered with fur, feathers or scales.

A supported walking system is thereby disclosed, comprising a robotic walking figure and a wheeled support that at least partially supports the robotic walking figure. The supported walking system is driven and controlled by a human operator.

In one embodiment, the walking figure is designed to look like a dinosaur, and the wheeled support is themed to look like an old fashioned wooden cart. The result creates the illusion that the dinosaur is pulling the cart, rickshaw style, when in fact the cart partially supports the walking machine and houses a human driver, computers, electronics, and batteries.

In one embodiment, the skin of the walking figure is supported by a unique skeletal support system comprising fiberglass, plastic and aluminum rings that are attached to each other and to the walking machine skeleton via a combination of rigid attachments and flexible rubber attachments. The effect is a realistic-looking skin that floats over the mechanical skeleton giving the appearance of a living animal.

Very few two-legged, freely walking robots have been created at all, and all of these may be tipped over. By attaching a robotic figure to a mobile cart, a number of issues associated with creating a large walking figure are addressed.

In one embodiment, the walking figure is further attached to cart via a "yoke". By attaching the walking figure to a cart via a "yoke", the robot is partially supported, and prevented from falling, ensuring the safety of people around it.

Furthermore, because the walking figure contains many individual actuators, the electronics, computers, and power source are too large to place inside the walking robot. The cart provides a convenient location for these components. They are connected to the walking robot by wiring that is hidden inside the yoke.

In an exemplary embodiment, the cart has two driven wheels and a swiveling caster. This allows the cart to drive its own weight and provides a stable base to support the walking robot. This configuration also allows a human operator to drive the cart using a simple joystick, to move forwards, backwards, to steer, and to turn in place.

Computer algorithms automatically control the robot's walking functions so that it may step forwards, backwards, and sideways in synchronicity with the movements of the cart while driving and turning at varying speeds.

The attached descriptions of exemplary and anticipated embodiments of the invention have been presented for the purposes of illustration and description. They are not intended to be exhaustive or to limit the invention to the precise forms disclosed. Many modifications and variations are possible in light of the teachings herein.

DRAWINGS

Figure 3A:
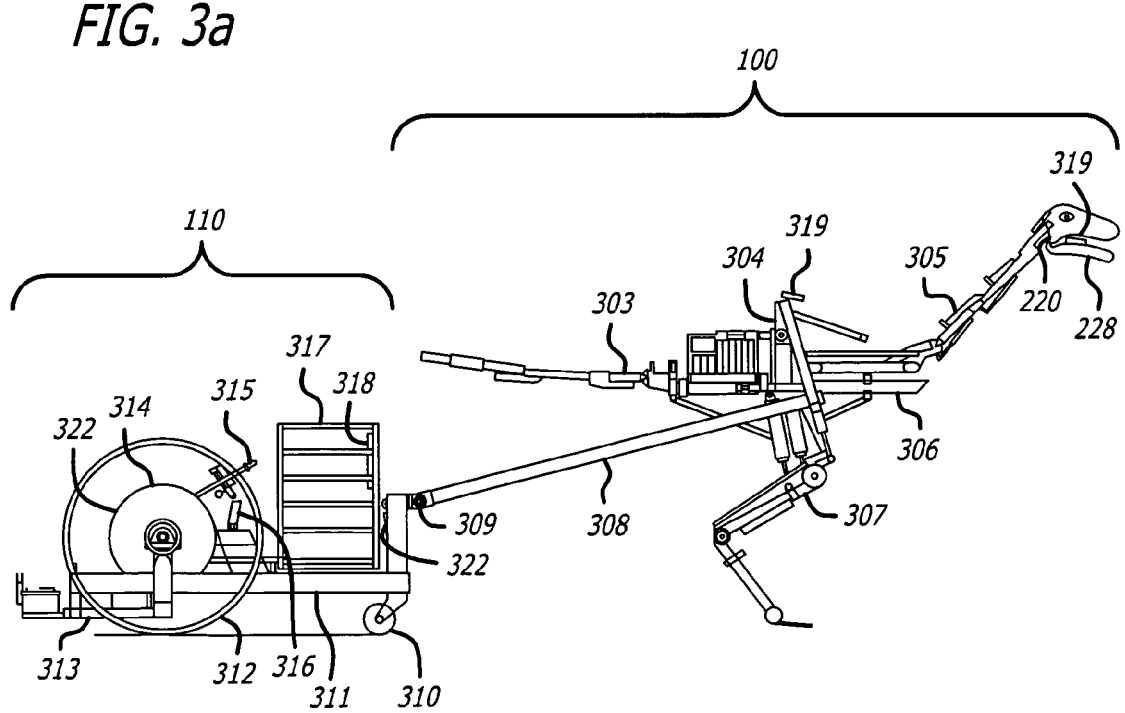
Figure 3B:
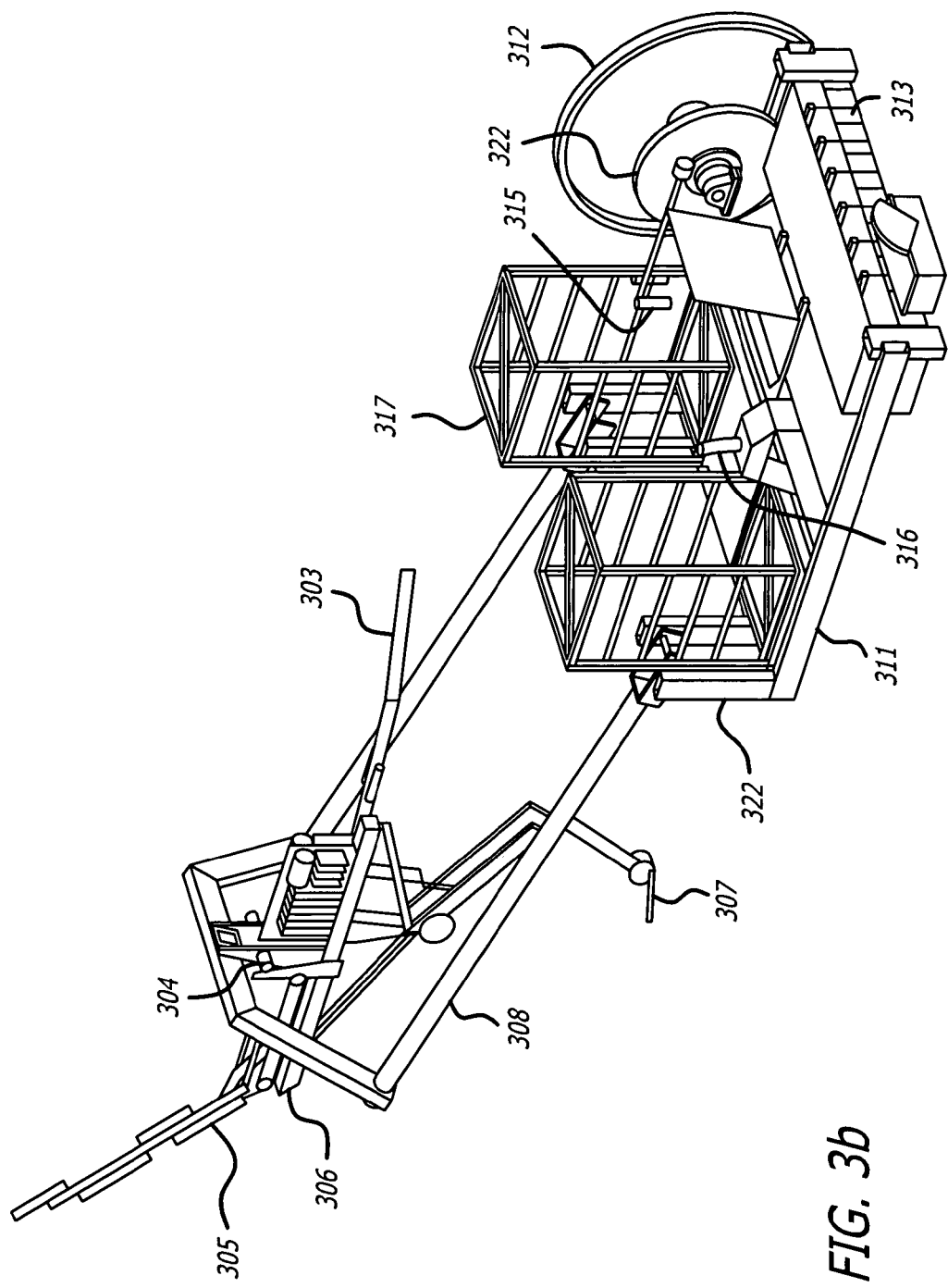

FIGS. 3*a* and 3*b* are CAD drawings of the supported walking figure without any theming elements.

Figure 4:
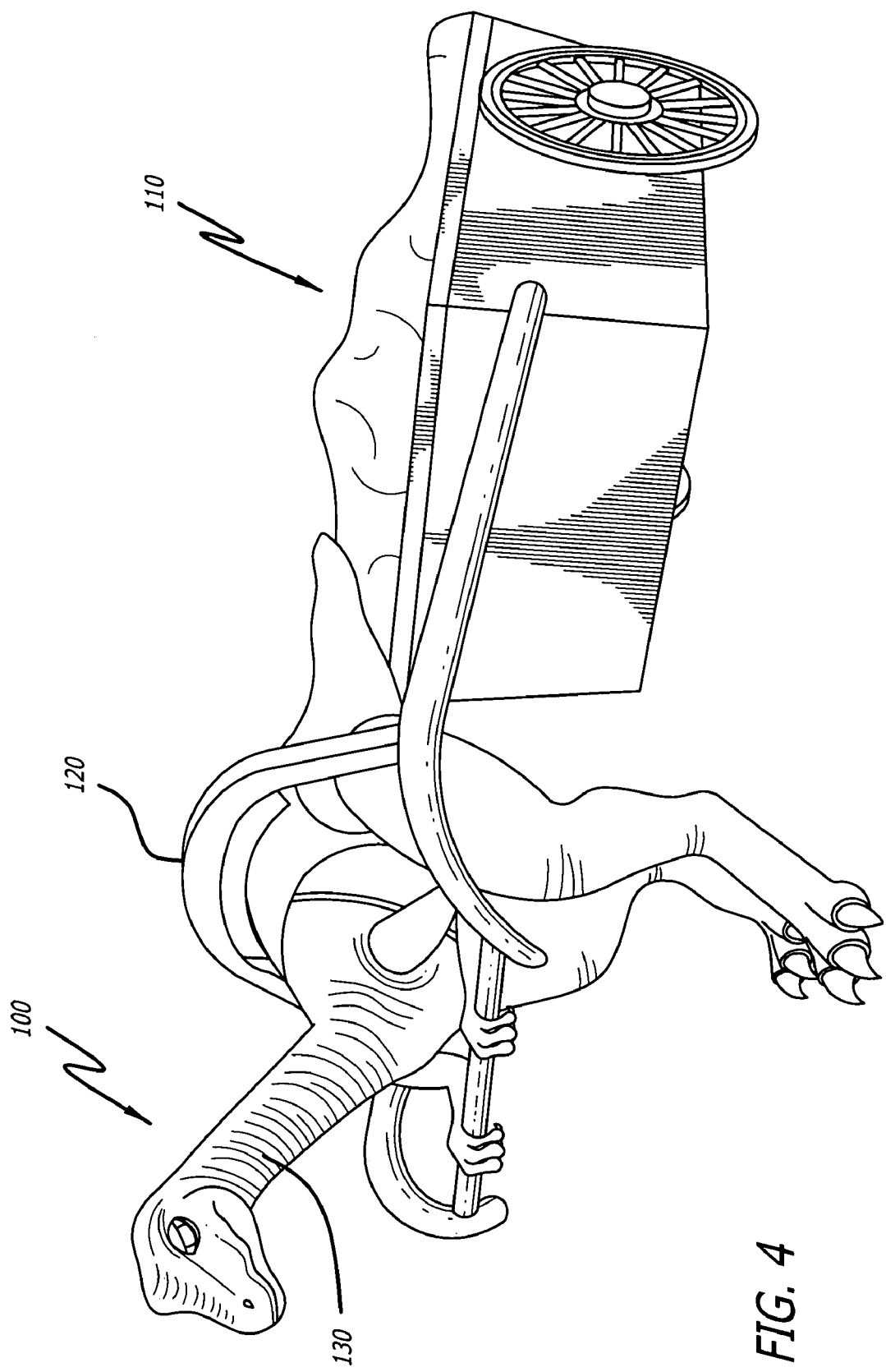

FIG. 4 is a photograph illustrating an exemplary embodiment of the skeletal support structure.

Figure 5:
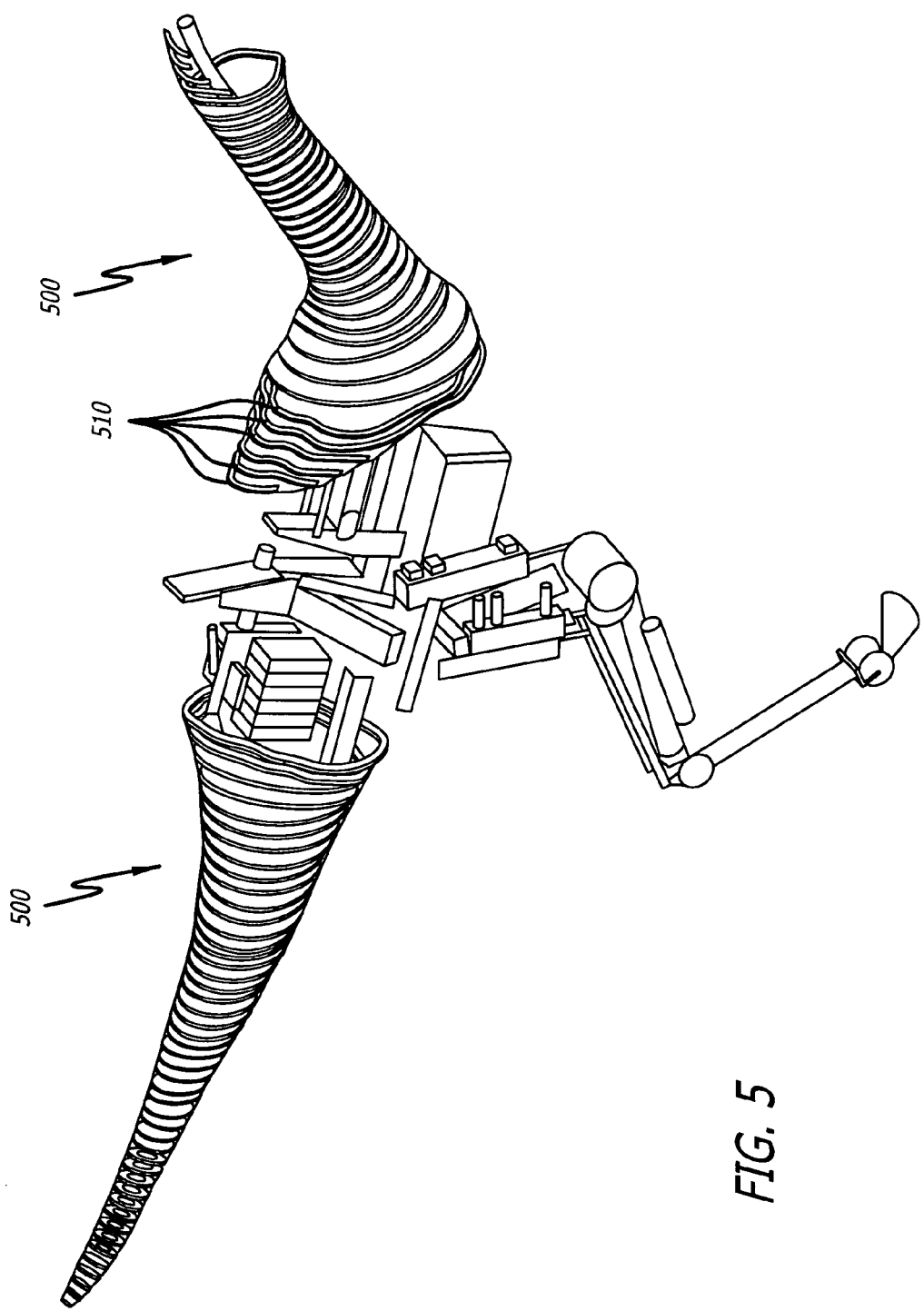

FIG. 5 is a CAD drawing illustrating the rings which form the skeletal support structure.

Figure 6:
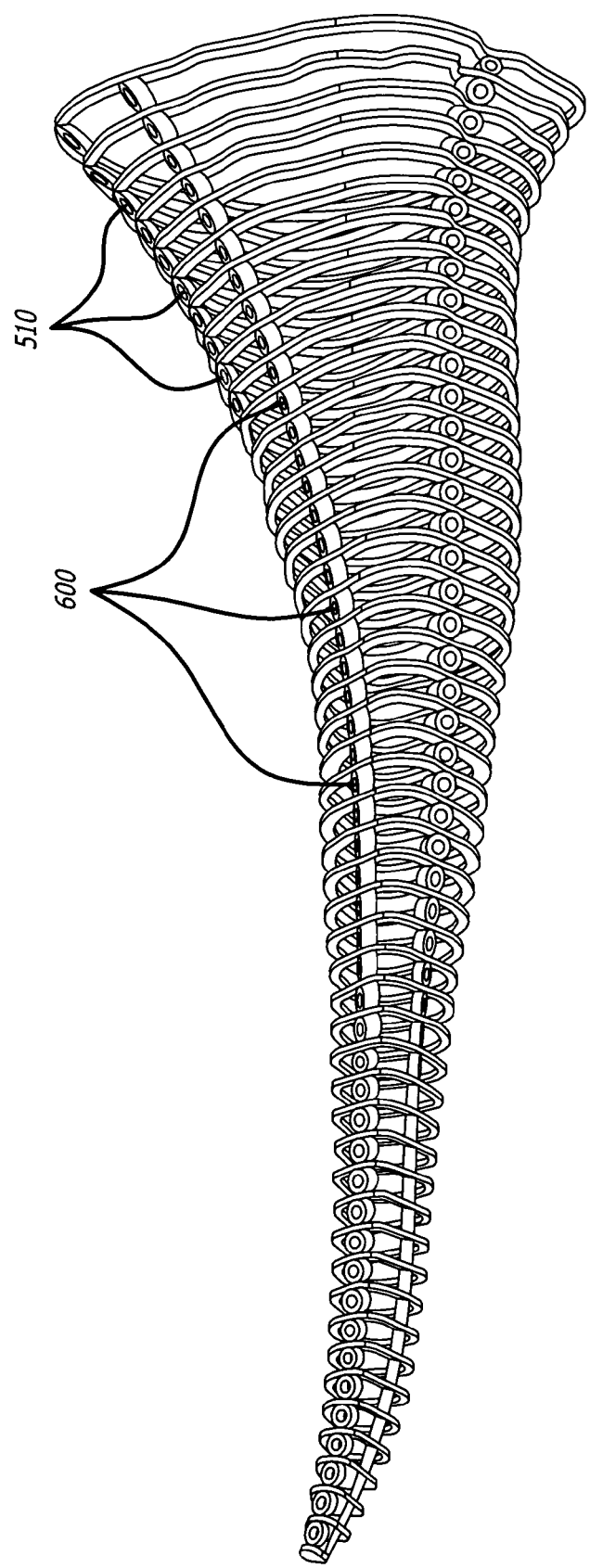

FIG. 6 is a close-up view illustrating an exemplary embodiment of the skeletal support structure.

FIG. 7 is a CAD drawing of the skeletal support structure.

FIG. 8 is a sketch of the skeletal support structure.

Figure 9A:
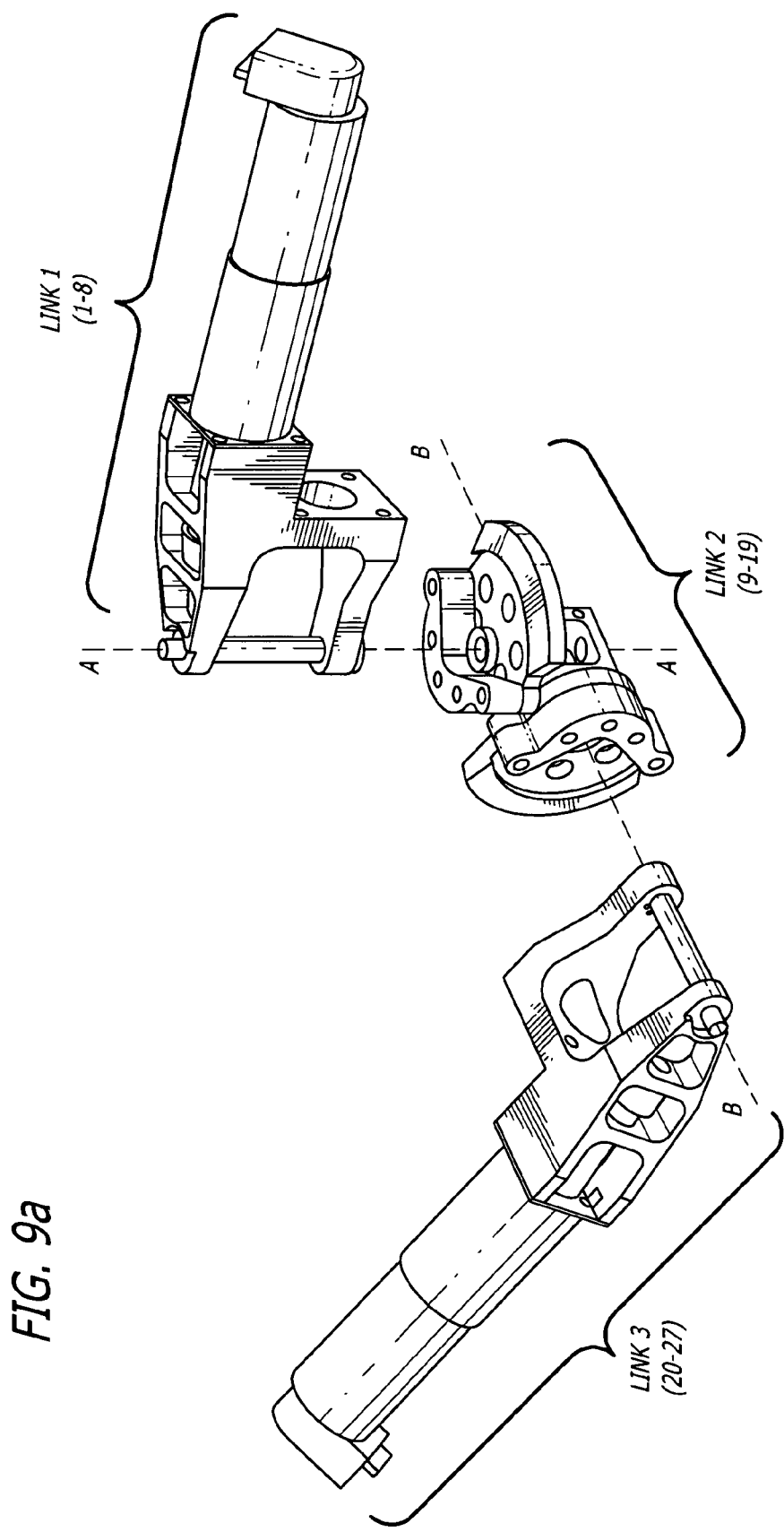
Figure 9B:
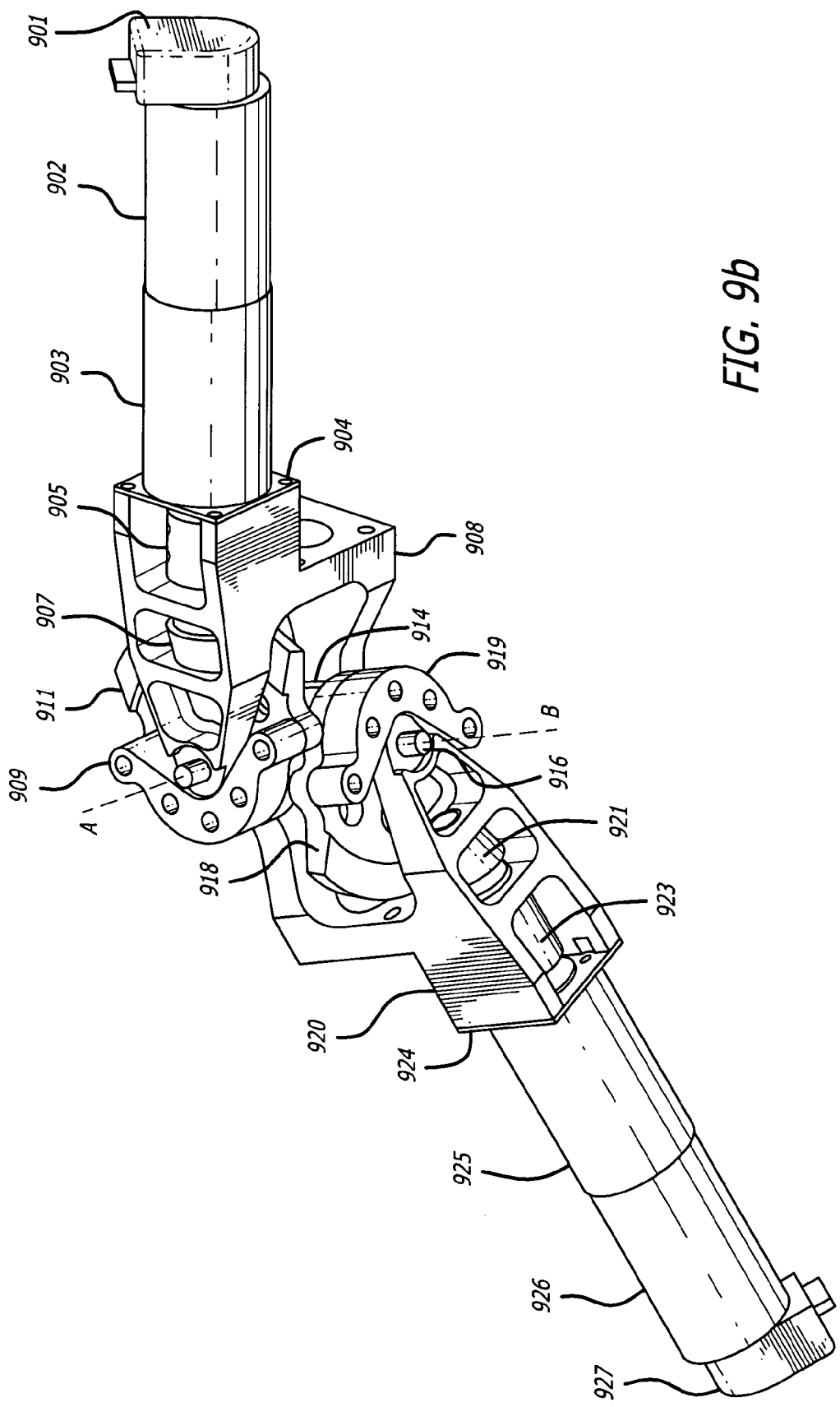
Figure 9C:
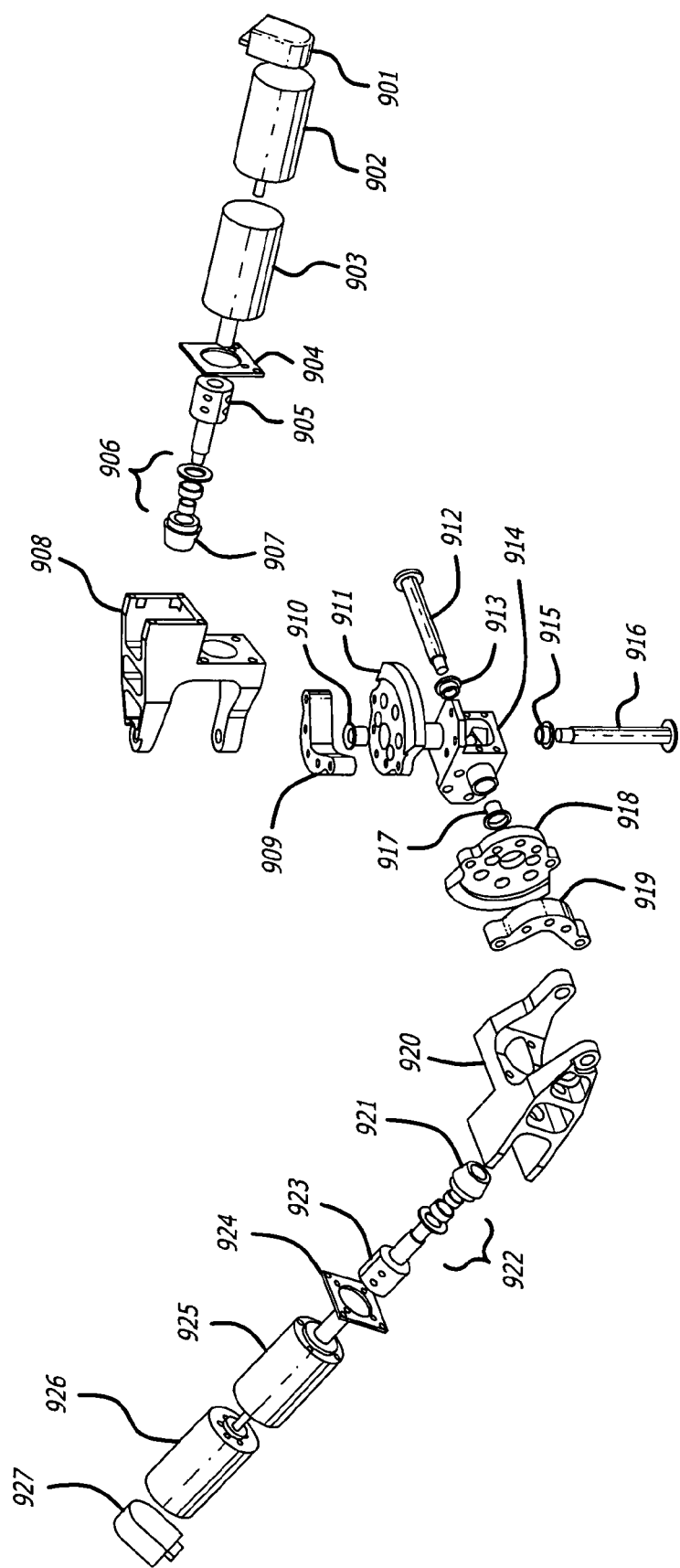

FIGS. 9*a*, 9*b* and 9*c* are CAD drawings of an exemplary embodiment of a compact robotic joint.

Figure 10:
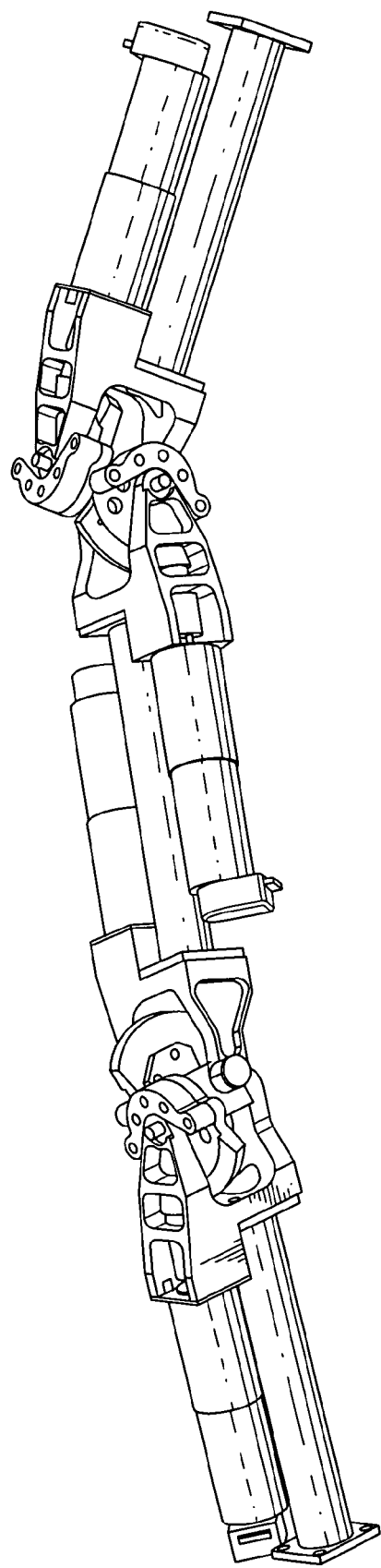
Figure 11:
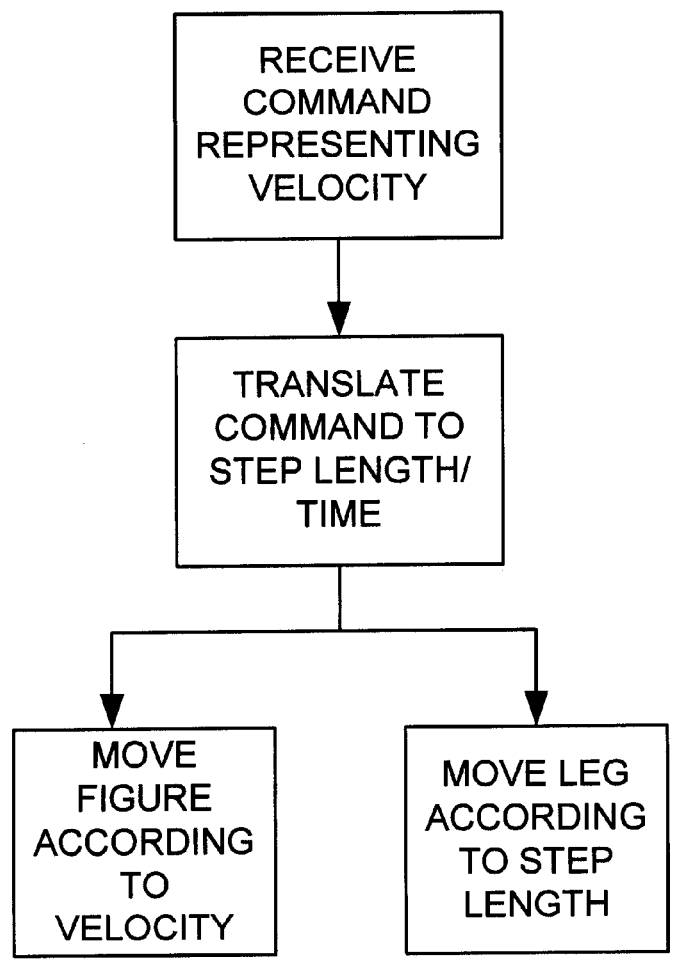

FIG. 10 shows how an articulated structure may be created by linking a series of exemplary joints together FIG. 11 is a flow diagram showing an embodiment of a method of controlling an animatronic supported walking system.

DETAILED DESCRIPTION

In one aspect, a supported walking system is disclosed, comprising a robotic walking figure and a wheeled support that at least partially supports the robotic walking figure. The supported walking system may be driven and controlled by a human operator. It should be noted that the walking figure need not resemble any shape presently known or recognizable. It may be entirely fanciful or utilitarian, depending on the effect desired, or the use intended for the system. Even though the embodiment depicted is a dinosaur that may be presented in a theme park, the inventors in no way intend this to be a limitation.

Figure 1:
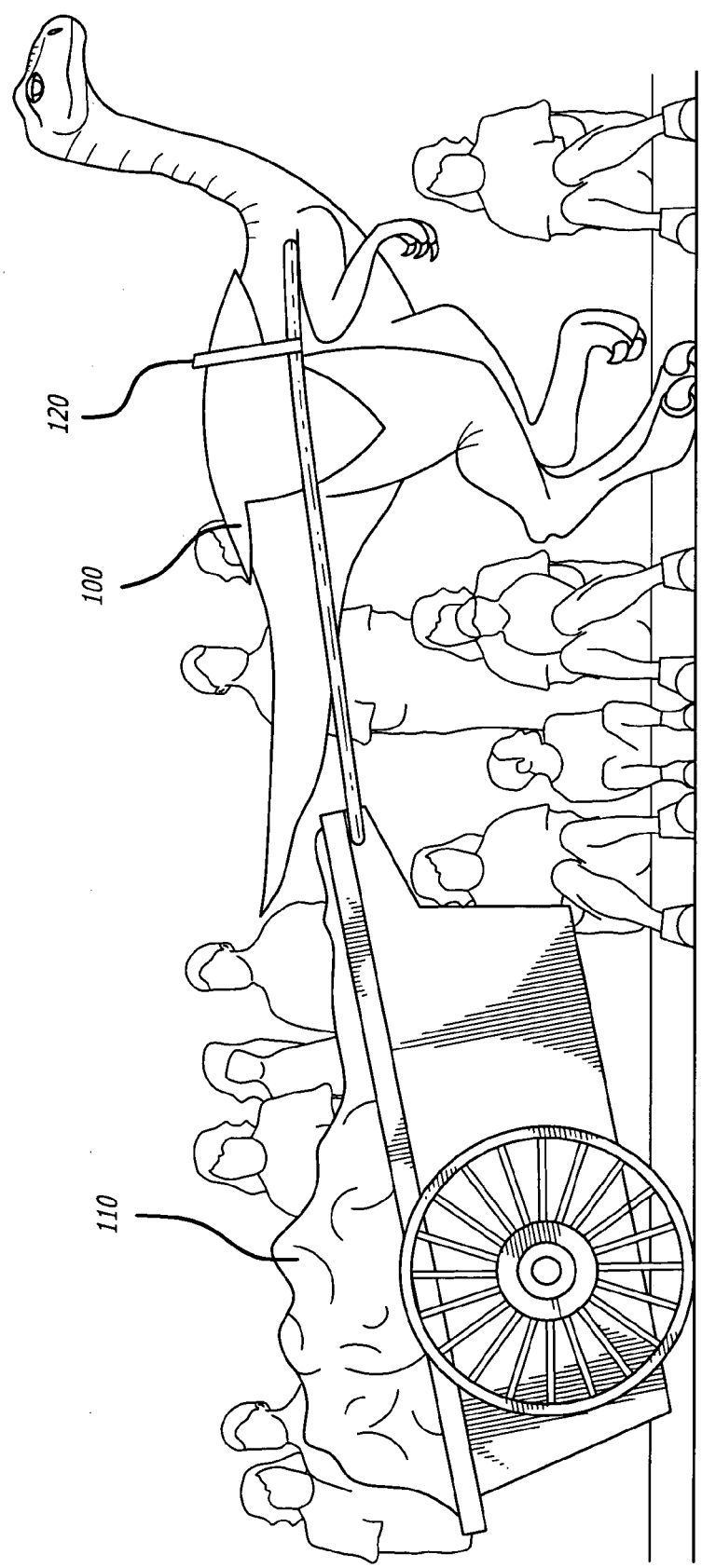
FIG. 1 is a sketch of an exemplary embodiment of a supported walking system.

FIG. 1 is a skeleton of an exemplary embodiment of the supported walking system. In one embodiment, the walking figure (100) is designed to look like a dinosaur, and the wheeled support (110) is themed to look like an old fashioned wooden cart. The dinosaur (100) is attached to the cart with a yoke (120). The resulting vehicle is designed to create the illusion that the dinosaur (100) is pulling the cart (110), rickshaw style, when in fact the cart partially supports the walking machine and also houses a human driver, computers, electronics, and batteries.

Supported Walking Figure—Kinematics

The following is a brief kinematic description of one embodiment of a supported walking system. In such an embodiment, the supported walking system comprises of a two-legged walking machine which is partially supported by a three-wheeled cart.

Figure 2:
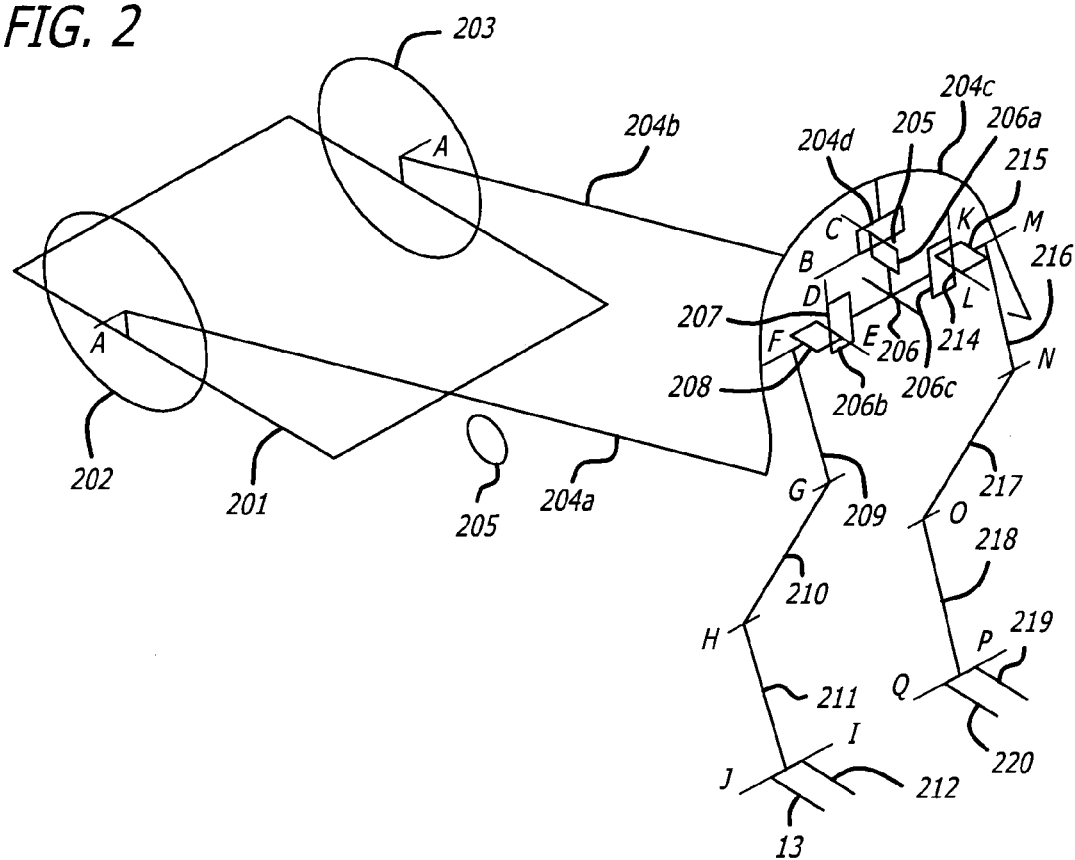
FIG. 2 is a kinematic drawing of the supported walking system.

FIG. 2 is a kinematic diagram of one embodiment of a supported walking system. The wheeled cart is shown as a square frame (201). A first wheel (202) and a second wheel (203) are mounted on each side to the side of the cart and rotate about axis A. The first wheel (202) and second wheel (203) are powered. A third wheel (205) is mounted to the front of the cart. The third wheel (205) can roll and rotate freely about a vertical axis to allow movement in any direction. A rigid yoke (204*a-c*) is attached to the cart so that the yoke and the walking figure can pivot freely about axis A. The yoke consists of two side beams (204*a* and 204*b*), and a curved member (204*c*) which fits around the walking machine. A clevis (204*d*) is fixed rigidly to the curved member. To this clevis is attached a link (205) which freely pivots relative to the yoke about horizontal axis B. The body of the walking machine (206) also has a clevis (206*a*) attached to it which pivots freely about link (205) through axis C. In one embodiment, axes B and C are perpendicular to each other. In this way, the body has two degrees of freedom relative to the yoke. Rigidly attached to the body are two additional clevises, (206*b*) and (206*c*). To these devises are attached the right and left legs of the walking machine, respectively.

Considering the right leg, link (207) is attached to the body through clevis (206*b*) and is free to pivot about axis D. In a current embodiment, this joint is powered. Link (208) is then attached to link (207) so that it is free to pivot about axis E. This joint is also powered. Axis D and E are perpendicular to each other. Link (209) is attached via a pivot to link (208) so that it may pivot about axis F, which is perpendicular to axes D and E. This joint is powered. Link (210) is attached to link (209) such that it may pivot about axis G. This joint is powered. Link (211) is attached to link (210) such that it may pivot about axis H. In the current embodiment, this link is constrained via a parallelogram linkage (not shown) such that its orientation relative to link (209) is fixed. Links (212) and (213) are attached to link (211) such that they may pivot independently about I and J respectively. These joints are also powered. The left leg is a mirror image of the right leg.

The following is a more detailed description of the mechanics in one embodiment of the supported walking system.

FIGS. 3*a* and 3*b* show illustrations of an exemplary embodiment of a supported walking system.

In one aspect, a two-legged, robotic machine, (100) is attached via a yoke (308) to a wheeled cart (110). As shown in FIGS. 3*a* and 3*b*, the supported walking machine consists of two legs (307), connected to a body (306). To this body are also attached a neck (305), and a tail (303). The body of the walking machine consists of a rigid tube. Each leg is a mechanism comprised of six computer-controlled electric motors that operate a series of links, and joints that allow the leg to arbitrarily position its foot at any position and orientation relative to the body, within a constrained volume. (Note that only one leg is shown in the figures). The neck (305) is a mechanism comprised of seven computer-controlled electric motors operating a series of links and joints. The neck supports a head (321), which itself contains a number of additional motors. These motors operate for example, the eyes, eyelids, mouth, and other facial features. Finally, a tail mechanism is attached to the rear end of the body tube (303). Similar in design to the neck, the tail is comprised of six electric motors that operate a series of links and joints.

The cart consists of a steel frame (311), to which two drive wheels (312) and a swiveling caster (310) are mounted. (Note that only one driven wheel is shown in the figures). The drive wheels are each powered by an electric motor and a belt reduction mechanism (322). The cart also houses electronics mounted in enclosures (317), a battery pack power source (313), a joystick (316), and a puppeting interface (315). A human operator sits in a seat (314) and uses the joystick to drive the cart, and the puppeting interface to control the movements of the walking machine's body, neck and head. Even though circular wheels are described herein, they could actually be other shapes (e.g. ovals) to provide desired effects, and could be tracked systems as well. The word "wheel" is to be understood in this way.

As the operator drives the cart, all of functions of the walking machine are controlled automatically by a series of computer algorithms to move synchronously with the cart. For example, these algorithms calculate when and where each foot must step, the speed and trajectory of each step and the body, neck, head and tail motions that accompany the stepping motions to create realistic-looking walking. The operator may override some of these automatically created motions, particularly those of the head and neck, by using the puppeting interface during walking. Depending on the use intended for the system, one or more functional arms or other appendages may be included, these arms having functions such as holding, pushing, lifting, etc. The tail and head could be eliminated or replaced with other structures. To facilitate operation of the system, the walking mechanism is equipped with cameras (319) and microphones (320) mounted in the head. The operator has a monitor (318) to view the video images, and headphones to hear sounds that allow the operator to better interact with guests standing near and talking to the system. The operator may also be positioned away from the walking mechanism, in a remote location, with remote control instrumentation. A wooden decorative frame covers the entire cart, to give the illusion that it is simply a traditional cart.

The cart and the walking machine are connected by a rigid yoke (308) via three unpowered joints. This yoke is connected to the cart via a hinge (309), and to the walking machine via a two-axis "universal" joint, (304). The hinge at the cart allows the walking machine to vary its height by extending its legs. The universal joint allows the walking machine to pitch its body forwards or backwards relative to the yoke, and to roll its body side to side. The combination of these three joints allows the walking machine to have a wide range of motion required for realistic looking walking and motion, while preventing the system from falling side-to-side, forwards, or backwards, even if all motors were to completely shut down and power off. The yoke attachment also incorporates a spring counterbalance mechanism (322). This mechanism applies a rotational torque to the yoke about hinge (309) that partially supports the weight of the walking machine.

Walking Algorithm

A system and method of controlling the supported walking system and causing the figure to walk is described with reference to FIG. 11.

In an exemplary embodiment, the supported walking system is driven by a human operator using a common two-axis joystick. The supported walking system can be viewed as a single vehicle with two driven wheels and two legs, each of which has several independent actuators.

The problem then, is how to generate a plurality of independent motion profiles from two joystick inputs. For example, it is a goal to create motions that make the system walk in a straight line, while turning, and at varying speeds.

The operator uses the joystick input to drive the cart, and the motions of the walking figure's legs are calculated by a computer algorithm in response to the cart motions. A brief description of this algorithm follows.

In an exemplary embodiment, a standard joystick that can be moved along two axes, either left/right, or forward/backward is used. The joystick directly controls the velocities of the two cart wheels. For example, if the joystick is moved to the left only, the left cart wheel will rotate backwards and the right wheel will rotate forwards. The cart will then rotate about a vertical axis directly between the two wheels, counterclockwise as viewed from above. If the joystick is moved to the right only, the wheels move in the opposite directions so that the cart will rotate clockwise when viewed from above. The velocity of the wheels is controlled by the distance the joystick is moved from its center position.

If the joystick is moved forward only, both wheels will rotate forward at the same velocity, and the cart will move forward. If the joystick is moved backward only, both wheels will rotate backward at the same velocity, and the cart will move backward.

If the joystick is moved at an angle, for example forward and to the right, the above motions are combined linearly so that the cart will move forward and turn to the right at the same time. Again the speed of the motion is controlled by how far the joystick is moved away from its center position.

The cart and the walking figure are attached by a rigid yoke with three freely-rotating joints, and at all times, one or both of the feet of the walking figure rest on the ground. Thus, the cart, the yoke, the walking figure, and the ground on which the system rests form one closed kinematic chain. (A closed kinematic chain is any series of rigid links and joints which closes upon itself to form a loop).

As the cart moves (as driven by the operator), the walking figure must move its legs relative to it's body in order to maintain the integrity of the kinematic chain. If the legs do not move appropriately, some portion of the kinematic chain will break, typically by feet slipping or losing contact with the ground. For example, if the cart moves forward, the feet must move backward relative to the body, without rotating relative to the ground in order that remain planted on the ground.

Sensors are incorporated on every moving joint in the cart, yoke, legs and body of the supported walking system. Because the dimensions of the system are known, the appropriate leg motions necessary to maintain the integrity of the kinematic chain can therefore be calculated. This is done using standard robotics techniques.

It should be noted that by using these techniques, the body of the walking figure can be moved even while the cart is stationary. In particular, corresponding to the un-actuated joints of the yoke, body can be tipped forward, as if bending forward to eat from the ground. The body can also be rolled about a longitudinal axis, or the body raised up or down to stand the walking figure higher or lower. To command such motions of the body, appropriate motions of the legs which both move the body and which maintain the integrity of the closed kinematic chain formed by the cart, yoke, walking figure and ground are calculated.

Because the legs of the walking figure have a limited range of motion, at some point the walking figure must take steps in order to accommodate the movement of the cart. To generate these steps, a computerized walking algorithm is used. A reference line is first chosen. In an exemplary embodiment, the reference line is a vertical line that passes through the pivots which attach the yoke to the figure. The walking figure uses this reference line and moves relative to this line. This line passes vertically through the center of the walking figure body.

As an example, consider a forward step. If the cart is moved forwards, the body of the walking figure will also move forward and the feet will remain stationary on the ground, but will move backward relative to the reference line. When either foot moves behind the reference line, the algorithm commands the most rearward foot to move to a specified distance in front of the reference line. This distance is a function of the cart velocity. Larger cart velocities will therefore generate larger steps. The foot which remains on the ground cannot step until the other foot has safely planted on the ground, at which point if it is behind the reference line, it will step forward. The trajectory of the leg while in the air is partially pre-determined. The height of the step is pre-determined, while the step length and step time are functions of the cart velocity when the step is commanded. The exact trajectory of the step is calculated as a function of these parameters.

At the conclusion of a step, when the foot comes in contact with the ground, the vertical motion of the foot is stopped when a preset foot/ground force threshold is exceeded. This allows the figure to walk on uneven surfaces by stopping the foot's vertical motion when it meets the ground instead of at a prescribed vertical position. The force applied is sensed indirectly by reading the current commanded to actuators in the legs. Since current applied to these motors is proportional to motor torque, an estimate of the force applied to the ground can be made.

If the cart were, for example, turning left while moving forward, then the foot would be placed both forward and to the left of the reference line, again as a function of the cart velocity.

In this way, steps can be made in any combination of forward/backward and left/right in order to steer the cart and walking figure. The steps so generated result in walking motions which give the illusion that the walking figure is in fact pulling the cart.

In another embodiment, a scripting language can be used to coordinate the movements of the walking figure (100). The scripting language can be a computer language that allows the user to provide a set of commands to the walking figure (100). In one embodiment, the scripting language provides for a combination of puppetry and fixed shows. Puppetry refers to a user's ability to provide interactive commands to puppet. In addition, a fixed show is a predetermined sequence of movements that a robotic figure can be programmed to perform without interaction from the user. The scripting language allows Lucky to simultaneously respond to puppeting instructions from a user's input and to perform a fixed show. For example, the walking figure (100) can be preprogrammed to sneeze at certain time intervals. At the same time the user can provide interactive instructions for the movement of the walking figure (100).

One potential application of the scripting language is for use with robotics on an assembly line. Many products are manufactured with robots that perform predetermined movements to accomplish a task on the assembly line. However, part of the assembly process may require some human interaction that cannot be automated. A user may want the flexibility to perform quality control on the product at the same time that the robot is assembling it. For instance, as the left arm of the robot performs a predetermined assembling routine on a product, the right arm can at the same time receive instructions from a human user to perform some quality control tests.

In addition, the scripting language can smooth out the trajectories of the movements of the walking figure (100). The scripting language provides robots with the ability to make smoother movements than can ordinarily be provided for. Traditional robots have awkward movements and sometimes even respond with inaccurate movements when receiving an unfamiliar command. The scripting language solves this problem by providing a trajectory even in the case that a command is unfamiliar. In one embodiment, the scripting language is applied in settings where the precise movements of a robot are critical for productivity and safety. For instance, in a hazardous waste setting, an inaccurate command by a user to a robot can result in harmful spillage of waste. If the robot was instructed to move in a relatively smooth trajectory, there would be less risk of accidental spillage. The use of the scripting language to produce smoother movements in the robotics field can be applied to a wide variety of fields where precision is of the utmost importance.

The scripting language can also provide for real time optimization. Previous scripting languages allocated memory and other computer resources as needed. These allocations can block the computer for arbitrary lengths of time. If memory is not allocated properly, the robot stops functioning. The scripting language here has a memory allocation method that prevents the computer from being blocked. Real time performance means that the task must be performed in a specified period of time. In one embodiment, the real time optimization technique is used with robots to ensure that robots do not unnecessarily stop functioning for a period of time. For instance, if a robot that is carrying hazardous waste even momentarily stops functioning, spillage may result.

Further, the scripting language can include an improved transformation technique. When a user provides a command to a robot instructing the robot to move in a certain way, a mathematical transformation between the user's instruction and the actual joint movements necessary to carry out the user's instruction must take place. The scripting language provides an interface that allows users to intuitively instruct the robot to move in a certain direction. Further, the interface simplifies the complexity of combining motions such as vertical and horizontal motions. For example, the robot may respond to an instruction of "walk straight" as opposed to "lift left leg vertically y feet, move left leg horizontally x feet".

One of ordinary skill in the art will recognize that the techniques that are used by the scripting language are not limited to scripting languages as opposed to other computer language. These techniques can also be employed in different types of computer languages. Further, the scripting language is not limited to a particular type of graphical user interface ("GUI"). Any number of GUIs can be used in conjunction with the scripting language. Any method, hardware, software, or circuitry needed to provide computerized instructions to the walking figure (100) can be utilized. One of ordinary skill in the art will recognize that any controller or memory needed to implement the scripting language can be utilized. Further, one of ordinary skill in the art will recognize that the scripting language can be stored within the walking figure (100) itself or at a remote location from which instructions are sent to the walking figure (100). As discussed above, the scripting language can be used in other applications besides the supported walking system.

Skeletal Support Structure & Skin

Further completing the overall image of a realistic looking robotic or animatronic character is the skin and skeletal structure.

Traditionally, animatronic figures have used hydraulic actuators, because of their very high power to size ratio. However, hydraulic systems have several disadvantages. Hydraulic oil tends to leak from these systems, damaging delicate skins and other outside coverings. They also require pressurization at pressures between 500 and 6000 psi. These high pressure systems must be kept away from people because ruptures in pressurized hydraulic lines can cause dangerous fluid jets. Hydraulic systems also support force on columns of hydraulic oil, which are necessarily compliant. This compliance limits the bandwidth of response of hydraulic systems. Finally, hydraulic systems require a significant infrastructure of pumps, oil reservoirs, manifolds, valves and accumulators.

It is, therefore, advantageous to use electric motors for robotics and animatronic figures. Electric motors, however, typically have a lower power to size ratio than do hydraulic actuators. Therefore, the weight of an electrically driven robotic or animatronic system becomes a critical issue and must be kept as low as possible.

There are several other problems which make the development of an understructure to support animatronic skins difficult. Real creatures have very large ranges of motion of their joints. This means to create realistic motions, skins and the structures supporting them must accommodate significant stretch and compression. Real creatures have a large number of degrees-of-freedom, especially in features such as a neck or a tail. It is costly to have as many joints in an animatronic figure as would exist in the real creature. So it is advantageous if the skin and supporting structure can enhance the look of the figure by making it appear as though there are more joints than are in the underlying mechanism. Real creatures are biological and therefore have complex outer shapes. A skin and supporting structure must maintain these shapes while looking realistic despite considerable movement, stretch and compression.

Therefore, it is advantageous for the skin and its supporting structure to occupy as little space as possible. Because the robotic mechanism strength is related to its size, if the skin and its supporting structure occupy a great deal of space, very little is left over for the mechanism, making it difficult to make sufficiently strong and rigid. Finally, the skin and its supporting structure should be easy to manufacture.

Therefore, a mechanism which will support animatronic skins through large ranges of motion with significant flexing and compression is needed. It is further desirable for the skin support mechanism to hide the underlying robotic structure. It is further desirable for the skin support structure to accommodate complex shapes. It is further desirable for the skin support structure to be extremely lightweight. It is further desirable for the skin support structure to occupy a small amount of space between the internal robotic mechanism and the skin itself. Finally, it is desirable that the skin support structure be simple to manufacture.

A skeletal support structure for a mechanical or robotic figure is therefore also disclosed. The skeletal support structure is a system that supports skins for animatronic figures which allows for a large range of motion, is compact in size, is lightweight, may be made in complex shapes, and is easy to manufacture. In an exemplary embodiment, a painted foam-latex skin covers the skeletal support structure.

FIGS. 4-8 illustrate exemplary embodiments of a skeletal support structure and overlying skin. FIG. 4 is a photograph which illustrates the realistic looking result achieved by the skin and skeletal structure in one embodiment.

In the embodiment shown in FIG. 4, the walking FIG. 100 is in the form of a dinosaur pulling a cart 110. The dinosaur is attached to the cart using a yoke 120. A painted foam latex skin 130 covers the skeletal support structure of the walking FIG. 100. The skin 130 is fabricated by pouring foam-latex into molds that represent the outside shape of the desired character. In the case of a dinosaur, the neck and tail portion of the dinosaur should move flexibly in many directions. In order for the dinosaur's movements to look real, a unique skeletal structure is used for the neck and tail portions. The effect is a realistic-looking skin that floats over the mechanical skeleton giving the appearance of a living animal.

The skeletal support structure comprises a plurality of rings that are attached to each other and at various points to the figure. The rings are attached to each other using flexible attachments, and to the figure at various locations using rigid or fixed attachments.

In one embodiment, the skin is supported by a skeletal support system comprising fiberglass, plastic and aluminum rings that are attached to each other and to the walking machine skeleton via a combination of rigid attachments and flexible rubber attachments.

FIG. 5 is an illustration of the skeletal support structure as found underneath the system illustrated in FIG. 4. Note that the head and tail portions are covered with a structure made of a plurality of rings. FIG. 6 is a photograph showing an enlarged view of the skeletal support structure in the tail. FIG. 7 is a illustration of the rings themselves. The rings are attached to each other by flexible elements. In our current embodiment, we have used pieces of latex surgical tubing. They are oriented to allow simple attachment to the rings using plastic tie wraps. This orientation also allows the rings to compress and expand upon one another with very little force. They may also rotate relative to each other, to allow a tail or neck to twist about it's longitudinal axis. The tube orientation, however, tends to prevent the rings from shifting or shearing relative to each other.

In one embodiment, the rings are fabricated by first making a computer scan of the tooling used to mold the flexible skin. Then, in a CAD program, the rings are designed by "slicing" the computer scanned surface. The rings are, for example, CNC milled from panels made by laminating carbon fiber sheeting to a nomex honeycomb core. These types of panels are commonly used in the aircraft industry as they are very stiff for their weight. By assembling the structure from rings made in this way, the complex skin shape is ensured to fit the structure which supports it. Furthermore, due to the thinness of the rings and flexibility of the flexible elastic tubing used to join them, the structure can accommodate a large degree of flexing and compression, as required when the underlying joints move through a large range of motion.

To mount the ring structure to the underlying tail mechanism, one ring per link of the structure is mounted to each link of the tail mechanism. In this way, the ring structure floats over the tail mechanism. In one embodiment, these rings are made from aluminum for strength.

FIG. 8 shows a schematic representation of this system mounted to a tail with three joints and four mechanical links. Rings (801), (802), (803) and (804) are mounted to tail links (805), (806), (807) and (808) respectively. The remaining rings, examples of which are labeled (809), are mounted to each other and to the fixed rings, but otherwise allowed to float over the tail mechanism. To enable the skin to slide smoothly over the ring structure, a lycra sock is mounted over the rings and underneath the skin. The rings, covered with lycra, produce a relatively smooth, continuous surface to support the tail skin, hiding the underlying tail mechanism and giving the illusion that there are many more than three actuated joints.

Compact Robotic Joint

Further in accordance with the supported walking system as has been described so far, a novel robotic joint is disclosed that is compact in size, incorporates two degrees-of-freedom at right angles to each other, and may be powered using electric actuators.

As mentioned earlier, it is advantageous to use electric motors for robotics and animatronic figures. However, electric motors operate most efficiently at high speeds. Since most robotic and animatronic systems have desired joint speeds many times less than the optimal operating speed of an electric motor, reduction gearing is required. It is also the case that the form factor of electric motors does not lend itself to simple packaging solutions to fit into the envelope required by many animatronic figures.

Specifically, it is often advantageous to turn the output of an electric motor by 90 degrees to optimally package it in a slender animatronic arm, neck or tail. Furthermore, it is advantageous to provide joints whose axis intersect or very nearly intersect, and are at right angles to each other. This is because the joints of animal's backs, necks, and tails consist of vertebrae which bend in at least two directions and it is necessary to represent these joints in an animatronic figure.

A compact robotic joint is therefore provided. The compact robotic joint has two rotational degrees-of-freedom where the axes of rotation intersect or nearly intersect and are at right angles with one another. The compact robotic joint may be powered using electric motors. The compact robotic joint further accommodates a significant gear reduction.

FIGS. 9a, 9b, 9c and 10 illustrate an exemplary embodiment of the compact robotic joint.

The joint consists of three links which may be actuated to move relative to each other. A first link (Link 1) moves relative to a second link (Link 2) along axis A. A third link (Link 3) moves relative to the second link along axis B. Note that in this embodiment, first and third links and are identical. While this need not be the case, making these links identical reduces manufacturing and inventory costs and is one of the features of this joint.

The first link (Link 1) is comprised of an electric motor (902) to the rear of which is attached a rotary encoder (901) to measure motor position. A planetary gearbox (903) is attached to the front of the motor. This assembly is attached to clevis (908) via an adapter plate (904). A coupler shaft (905) is rigidly attached to the shaft of the gearbox and a right-angle bevel gear pinion (907) is rigidly fixed to the coupling using a dowel pin (not shown). The coupler shaft is rotatably mounted into the clevis using a combination of rotary and thrust bushings (906).

The second link (Link 2) is comprised of a main block (914), to which is mounted bevel gear sectors (911) and (918) and motion stops (909) and (019). Flanged bushings (910), (913), (915), and (917) are also pressed into the first link.

The first link is rotatably mounted to the second link using a shaft (916). The third link is similarly rotatably mounted to the second link using a shaft (912).

Power is transmitted from the first link to the second link through pinion (907) to gear (911). By controlling the orientation of motor (902), the orientation of the second link is controlled relative to the first link. Similarly, power is transmitted from the third link to the second link through pinion (921) to gear (918). By controlling the position of motor (926), the orientation of the third link is controlled relative to the second link.

A controllable, articulated structure may be created by linking a series of these joints together, see FIG. 10.

While the system has been described in detail and with reference to specific embodiments, it will be apparent to those skilled in the art that various changes and modifications can be made therein without departing from the spirit and scope thereof. Thus, it is intended that the claimed invention not be limited to any specific description above, and that it includes modifications and variations provided they come within the scope of the appended claims and their equivalents.

Other embodiments and implementations may be utilized and structural and functional changes may be made without departing from the respective scope of the claimed invention. The attached description of exemplary and anticipated embodiments have been presented for the purposes of illustration and description. They are not intended to be exhaustive or to limit the invention to the precise forms disclosed.

Many modifications and variations are possible in light of the teachings herein. Many other forms of the invention exist, each differing from the others in matters of detail only. The invention is to be determined by the following claims.

We claim:

1. A method of controlling the movement of a legged figure coupled to a drive mechanism, the method comprising:
   receiving a command from an input device, the command representing a velocity to move the figure;
   translating the velocity into a step length;
   moving the entire figure at the velocity represented by the received command using the drive mechanism, wherein the act of moving the entire figure is implemented by a wheeled vehicle coupled to the figure;
   while the figure is moving, coordinating the leg movement by moving a first leg a distance corresponding to the step length; and
   moving a second leg once the first leg is planted on the ground.

2. The method of claim 1 wherein the input device directly controls the velocity.

3. The method of claim 1 wherein the act of moving the first leg comprises determining the force when contacting the ground.

4. The method of claim 1 wherein the act of moving the first leg comprises moving the first leg along a partially predetermined trajectory.

5. The method of claim 1 wherein the act of moving the first leg comprises moving the first leg along a partially predetermined trajectory.

6. The method of claim 1 wherein the act of moving the first leg comprises moving the first leg to a predetermined height.

7. The method of claim 1 further comprising:
   translating the velocity into a step time; and
   completing the act of moving the first leg within the step time.

8. The method of claim 1 further comprising:
   stopping vertical motion of the first leg at the conclusion of a step when a preset ground force threshold is exceeded.

9. The method of claim 8 wherein the ground force is sensed indirectly by reading the current commanded to actuators in the first leg.

10. A method of controlling the movement of a legged figure, comprising:
    coupling the legged figure to a wheeled support, the wheeled support being propelled by a drive mechanism;
    receiving a command from an input device, the command representing a velocity to move the wheeled support;
    translating the velocity into a step length of the legged figure;
    moving the wheeled support at the velocity represented by the received command using the drive mechanism; and
    simultaneously moving the legged figure by moving a first leg a distance corresponding to the step length and moving a second leg once the first leg is planted on the ground, the movement of the legged figure being synchronized with the movement of the wheeled support.

11. The method of claim 10 wherein the moving the first leg comprises moving the first leg along a partially predetermined trajectory.

12. The method of claim 10 wherein the moving the first leg comprises moving the first leg to a predetermined height.

13. The method of claim 10 further comprising:
    stopping vertical motion of the first leg at the conclusion of a step when a preset ground force threshold is exceeded.

14. The method of claim 13 wherein the ground force is sensed indirectly by reading the current commanded to actuators in the first leg.

15. A method of controlling the movement of a legged figure, comprising:
    coupling the legged figure to a mobile support that is propelled by a drive mechanism;

receiving a command from an input device representing a velocity to move the mobile support;

translating the velocity into a step length of the legged figure;

moving the mobile support at the velocity represented by the received command using the drive mechanism; and concurrent with the moving of the mobile support, moving the legged figure by moving a first leg a distance of about the step length and moving a second leg a distance of about the step length after the first leg is moved the distance.

16. The method of claim 15, wherein the moving of the first leg comprises moving the first leg along an at least partially predetermined trajectory.

17. The method of claim 15, wherein the moving of the first leg comprises moving the first leg to a predetermined height.

18. A method of controlling the movement of a legged figure coupled to a drive mechanism, the method comprising:

receiving a command from an input device, the command representing a velocity to move the figure;

translating the velocity into a step length;

translating the velocity into a step time;

moving the legged figure at the velocity represented by the received command using the drive mechanism; and while the legged figure is moving, coordinating the legged figure moving by first moving a first leg a distance corresponding to the step length within a time equal to about the step time and second moving a second leg a distance corresponding to the step length within a time equal to about the step time.

* * * * *

UNITED STATES PATENT AND TRADEMARK OFFICE
CERTIFICATE OF CORRECTION

| | | |
|---|---|---|
| PATENT NO. | : 7,238,079 B2 | |
| APPLICATION NO. | : 10/757797 | |
| DATED | : July 3, 2007 | |
| INVENTOR(S) | : Madhani et al. | |

It is certified that error appears in the above-identified patent and that said Letters Patent is hereby corrected as shown below:

Title Page
Item (73), delete "Enterprise", and insert therefor --Enterprises--.

Signed and Sealed this

Fourteenth Day of August, 2007

JON W. DUDAS
*Director of the United States Patent and Trademark Office*